United States Patent Office 3,500,372
Patented Mar. 10, 1970

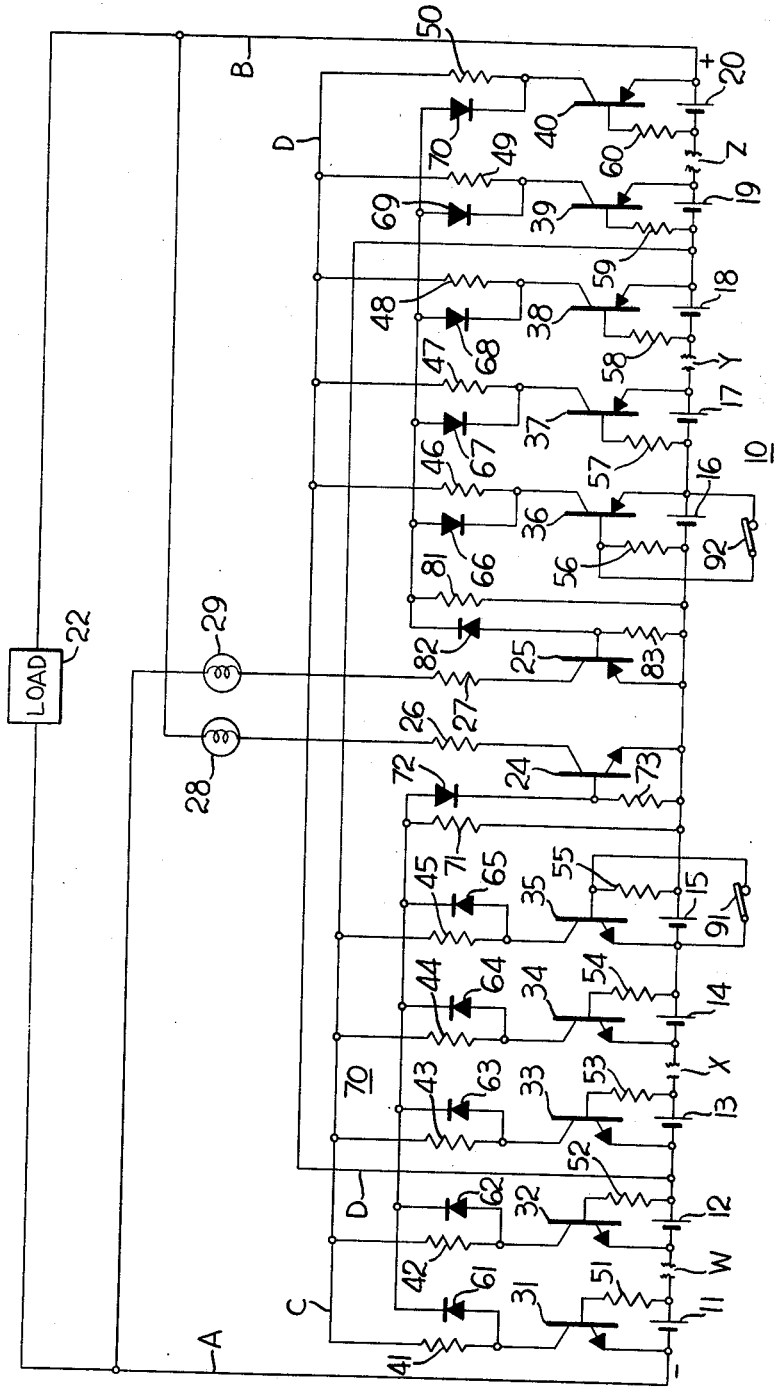

3,500,372
ELECTROCHEMICAL BATTERY MONITORING SYSTEM
Tom N. Thiele, Milwaukee, Wis., assignor to Allis-Chalmers Manufacturing Company, Milwaukee, Wis.
Filed July 17, 1967, Ser. No. 653,710
Int. Cl. G08b 21/00
U.S. Cl. 340—249          6 Claims

ABSTRACT OF THE DISCLOSURE

A fuel cell battery is connected to furnish power to a load. A sensing transistor is connected across each of the individual cells of the battery to sense the condition of that individual cell. The sensing transistors are connected in two banks of circuits to each control a switching transistor. Upon polarity reversal or low output voltage in any cell, the associated sensing transistor operates to turn on a switching transistor to light a lamp indicating that cell failure has occurred in the indicated portion of the battery.

---

This invention relates to systems for monitoring the operation of electrochemical batteries, and particularly to systems that monitor each cell of a fuel cell battery to determine cell voltage below a preselected level or polarity reversal.

One of the significant problems in operating electrochemical batteries such as fuel cell batteries in typical load applications is that individual cells occasionally drop excessively in voltage or even reverse in polarity because of internal functional faults. Since such reversal has serious electrochemical consequences, it is desirable to have simple and effective means for providing an immediate indication of such failure so that appropriate action, such as purging the fuel cell battery, reducing the electrical load, or increasing fuel flow can be taken.

With this invention a simple and effective circuit monitors each of the cells of a battery. The circuit operates on power from the battery itself with high reliability at a relatively low construction cost and without requiring any additional power source.

The drawing is a schematic of a fuel cell battery and load system and a monitoring means according to this invention.

Referring to the drawing, a fuel cell battery 10 having individual cells 11 through 20 is connected by conductors A and B to furnish power to a load 22. A group of sensing devices such as transistors 31 through 40 each have their base-emitter circuits connected across each individual cell 11 through 20, respectively, to monitor the individual fuel cell voltages. Collector resistors 41 through 45 are connected to the collectors of transistors 31 through 35, respectively, and are connected by a conductor C to a selected potential, such as between cells 18 and 19, positive relative to the fuel cell battery center tap potential and the emitter of a switching transistor 24. Transistors 31 through 35, collector resistors 41 through 45, and diodes 61 through 65 are part of a NOR circuit 70 that controls a switching means such as switching transistor 24.

Similarly, collector resistors 46 through 50 are connected to the collectors of transistors 36 through 40, respectively, and are connected by a conductor D to a selected potential, such as between cells 12 and 13, negative relative to the fuel cell battery center tap potential and the emitter of a switching transistor 25. Transistors 36 through 40, collector resistors 46 through 50, and diodes 66 through 70 are part of a NOR circuit 80 that controls a switching means such as switching transistor 25.

Switching transistor 24 is connected to respond to the output of NOR circuit 70 produced by the turning off of a sensing transistor connected to a cell in the negative half of the fuel cell battery, that is, cells 11 through 15; and switching transistor 25 is connected to respond to the output of NOR circuit 80 produced by the turning off of a sensing transistor in the positive half of the fuel cell battery, that is, cells 16 through 20.

In the operation of the monitoring system, each of the sensing transistors has its emitter-base circuit connected across an individual associated cell and each remains turned on as long as there is sufficient cell voltage to maintain current through its base-emitter. Current limiting resistors 51 through 60 are respectively connected in the base circuit of each transistor. When the voltage of a cell drops below the holding level determined by the characteristics of the associated sensing transistor, the associated transistor turns off. When a sensing transistor turns off, current flows through conductor C for the negative half of the battery, or conductor D for the positive half of the battery, through the associated collector resistor 41 through 50, and through the associated diode 61 through 70 to turn on the associated switching transistor 24 or 25. The negative-half switching transistor 24 turns on as current flows through a diode 72 as the forward bias voltage appears across a resistor 73. Similarly, the positive-half switching transistor turns on as current flows through a diode 82 as the forward bias voltage appears across a resistor 83. Resistors 71 and 81 are connected to shunt excess current around switching transistors 24 and 25, respectively.

With switching transistor 24 turned on, current flows through the emitter-collector of transistor 24, a collector resistor 26, and an indicating means such as a lamp 28 to conductor B to turn on lamp 28; and with switching transistor 25 turned on current flows through the emitter-collector of transistor 25, a collector resistor 27, and an indicating means such as lamp 29 to conductor A to turn on lamp 29. The turning on of a lamp indicates in which portion of the fuel cell battery the cell failure has occurred. If the problem in a faulty fuel cell is corrected to restore its voltage, the sensing transistor turns on to turn off the indicating lamp.

The individual fuel cell voltage at which the sensing transistor operates can be selected as desired. In the embodiment disclosed and using germanium sensing transistors, the sensing transistors turn off when the associated cell voltage drops below a level of about .2 volt. Other levels can be obtained in several ways such as by using silicon sensing transistors, adding one or more silicon or germanium diodes in the base-emitter circuit of the sensing transistor, or using an adjustable resistance voltage divider in the input circuit of each sensing transistor.

With this system, the fuel cell battery is the power source for the entire monitoring system including the indicating means. In addition, this system enables the use of a source "tap off" at any point in the fuel cell battery to provide voltage at any desired level available from the fuel cell battery. This permits the use of low voltage rating, and, therefore, less expensive, transistors. Breaks W, X, Y and Z in the fuel battery schematically indicate that the cells of the battery and the cells used to furnish operating voltage can be of any selected number.

Switches 91 and 92 are connected across the emitter-base of transistors 35 and 36, respectively, to provide a simple means for testing the operation of the circuit. By closing the switch the associated sensing transistor is turned off to turn on the associated switching transistor.

The embodiments of the invention in which an exclusive property or privilege is claimed are defined as follows:

1. Means for monitoring the cells in an electrochemical battery to indicate the failure of a cell, said means comprising:

a group of semiconducting sensing devices each having an input voltage sensing circuit and an output switching circuit having an on and off condition with said group connected to monitor an associated group of cells with each of said sensing devices having its input circuit connected across a respective cell to turn on its output circuit when the respective cell voltage is above a preselected level, and with said group of devices each having its output circuit connected to a common point to form a NOR circuit that produces an output when any sensing device output circuit is in an off condition, said NOR circuit connected to obtain electrical power from a preselected voltage level in the battery, semiconductor switching means associated with said group coupled to said common point and connected to turn on in response to the NOR circuit output; and indicating means connected to respond to the turning on of the switching means to provide an indication of cell failure in the associated group of cells.

2. Means for monitoring according to claim 1 wherein the sensing semiconductors are transistors each having a base-emitter connected across its respective cell and the switching semiconductor is a switching transistor.

3. Means for monitoring according to claim 2 wherein said battery is a fuel cell battery and comprising a plurality of said groups of sensing semiconductors with each of said groups of semiconductors connected to monitor a different group of cells and with at least one group monitoring a group of cells not in the most positive portion of the battery with said one group obtaining power from a selected more positive point in the fuel cell battery and at least one other group monitoring a group of cells not in the most negative portion of the battery with said other group obtaining power from a selected more negative point in the fuel cell battery;

said switching semiconductor and said indicating means being connected to each said group.

4. Means for monitoring according to claim 2 comprising a first and second group of sensing transistors with said first group comprising NPN sensing transistors connected to monitor the cells in the negative half of the battery and to form a NOR circuit obtaining power from a selected more positive point in the fuel cell battery and said second group comprising PNP sensing transistors connected to monitor the cells in the positive half of the battery and to form a NOR circuit obtaining power from a selected more negative point in the fuel cell battery; and wherein a first switching means and a first indicating means are associated with the first group of sensing transistors and a second switching means and a second indicating means and associated with the second group of sensing transistors and wherein said first switching means comprises an NPN switching transistor associated with the NOR circuit of said first group and said second switching means comprises a PNP switching transistor associated with the NOR circuit of said second group.

5. Means for monitoring in accordance with claim 2 wherein said NOR circuit includes a plurality of collector resistors each of which has one side connected to the collector of one of said sensing transistors and all of which have the other side connected to a common point and to said battery.

6. Means for monitoring in accordance with claim 2 wherein said NOR circuit also includes a plurality of diodes each of which has one side connected to the collector of one of said sensing transistors and all of which have the other side connected to said common point which is coupled to said semiconductor switching means.

References Cited

UNITED STATES PATENTS

| | | | |
|---|---|---|---|
| 3,122,729 | 2/1964 | Bothwell et al. | 340—149 XR |
| 3,337,845 | 8/1967 | Hart | 340—381 XR |
| 3,343,152 | 9/1967 | Hart | 340—249 |

JOHN W. CALDWELL, Primary Examiner

DANIEL MYER, Assistant Examiner

U.S. Cl. X.R.

340—248